United States Patent
Bollano et al.

(10) Patent No.: US 9,225,965 B2
(45) Date of Patent: Dec. 29, 2015

(54) METHOD AND SYSTEM FOR PRODUCING MULTI-VIEW 3D VISUAL CONTENTS

(75) Inventors: Gianmario Bollano, Turin (IT); Donato Ettorre, Turin (IT); Davide Spinnato, Turin (IT)

(73) Assignee: Telecom Italia S.p.A., Milan (IT)

( * ) Notice: Subject to any disclaimer, the term of this patent is extended or adjusted under 35 U.S.C. 154(b) by 460 days.

(21) Appl. No.: 13/128,199

(22) PCT Filed: Nov. 7, 2008

(86) PCT No.: PCT/IT2008/000695
§ 371 (c)(1),
(2), (4) Date: May 6, 2011

(87) PCT Pub. No.: WO2010/052741
PCT Pub. Date: May 14, 2010

(65) Prior Publication Data
US 2011/0211045 A1  Sep. 1, 2011

(51) Int. Cl.
*H04N 13/02* (2006.01)
*G06T 7/00* (2006.01)
*G06T 15/20* (2011.01)
*H04N 13/00* (2006.01)

(52) U.S. Cl.
CPC .......... *H04N 13/0239* (2013.01); *G06T 7/0075* (2013.01); *G06T 15/20* (2013.01); *H04N 13/0022* (2013.01); *H04N 13/0242* (2013.01); *H04N 13/0246* (2013.01); *H04N 13/0275* (2013.01); *H04N 13/0018* (2013.01); *H04N 2213/003* (2013.01)

(58) Field of Classification Search
CPC combination set(s) only.
See application file for complete search history.

(56) References Cited

U.S. PATENT DOCUMENTS

| 5,617,334 A | * | 4/1997 | Tseng et al. | ........... 708/203 |
| 7,764,827 B2 | * | 7/2010 | Op De Beeck et al. | ....... 382/154 |
| 8,538,166 B2 | * | 9/2013 | Gordon et al. | ............. 382/201 |
| 8,660,329 B2 | * | 2/2014 | Skalli et al. | ............... 382/131 |

(Continued)

FOREIGN PATENT DOCUMENTS

| WO | 97/01113 A2 | 1/1997 |
| WO | 2008/053417 A1 | 5/2008 |

OTHER PUBLICATIONS

International Search Report and Written Opinion mailed Jul. 30, 2009, PCT/IT2008/000695.

(Continued)

*Primary Examiner* — Dave Czekaj
*Assistant Examiner* — Kehinde O Abimbola
(74) *Attorney, Agent, or Firm* — Banner & Witcoff, Ltd.

(57) ABSTRACT

A method for producing 3D multi-view visual contents including capturing a visual scene from at least one first point of view for generating a first bidimensional image of the scene and a corresponding first depth map indicative of a distance of different parts of the scene from the first point of view. The method further includes capturing the visual scene from at least one second point of view for generating a second bidimensional image; processing the first bidimensional image to derive at least one predicted second bidimensional image predicting the visual scene captured from the at least one second point of view; deriving at least one predicted second depth map predictive of a distance of different parts of the scene from the at least one second point of view by processing the first depth map, the at least one predicted second bidimensional image and the second bidimensional image.

18 Claims, 10 Drawing Sheets

(56) References Cited

U.S. PATENT DOCUMENTS

| | | | |
|---|---|---|---|
| 2006/0232666 | A1* | 10/2006 | Op De Beeck et al. ......... 348/51 |
| 2007/0018977 | A1* | 1/2007 | Niem et al. .................... 345/422 |
| 2007/0247522 | A1* | 10/2007 | Holliman ......................... 348/46 |
| 2007/0296721 | A1 | 12/2007 | Chang et al. |
| 2008/0118143 | A1* | 5/2008 | Gordon et al. ................ 382/154 |
| 2008/0232680 | A1* | 9/2008 | Berestov et al. .............. 382/154 |
| 2008/0260288 | A1* | 10/2008 | Redert ........................... 382/285 |
| 2009/0073258 | A1* | 3/2009 | Robert et al. ................... 348/47 |
| 2010/0074532 | A1* | 3/2010 | Gordon et al. ................ 382/203 |
| 2010/0174673 | A1* | 7/2010 | Skalli et al. ...................... 706/50 |
| 2011/0015514 | A1* | 1/2011 | Skalli et al. .................... 600/407 |
| 2011/0084966 | A1* | 4/2011 | Kao et al. ....................... 345/426 |
| 2011/0181704 | A1* | 7/2011 | Gordon et al. .................. 348/49 |

OTHER PUBLICATIONS

Y.S. Ho, et al., "Three-dimensional video generation for realistic broadcasting services," International Technical Conference on Circuits/Systems, Computers and Communications (ITC-CSCC), Shimonoseki, Japan, pp. TR1-TR4, Jul. 6-9, 2008.

Davide Spinnato: "Studio e realizzazione di un'architettura di videocomunicazione 3D con acquisizione e sintesi di mappe di profondita", Testi di Laurea Politecnico di Torino, [online], Nov. 1, 2008, pp. 1-212, [XP002537270], <Retrieved from Internet: URL: http://163.162.93.20/portal/public/tesi/tesidavide.pdf> retrieved Jul. 14, 2009 [[English translation not available, English Title: "Study and implementation of an architecture of videocommunication 3D with acquisition and synthesis of maps of depth"]].

Gi-Mun Um, et al., "Three-dimensional scene reconstruction using multiview images and depth camera", Proceedings of the SPIE, vol. 5664, pp. 271-280 (Mar. 22, 2005).

Eun-Kyung Lee, et al., "High-resolution depth map generation by applying stereo matching based on initial depth information", 3DTV Conf: The True Vision—Capture, Transmission and Display of 3D Video, 2008, IEEE, May 28, 2008, pp. 201-204.

Klaus-Dieter Kuhnert, et al., "Fusion of stereo-camera and PMD-camera data for real-time suited precise 3D environment reconstruction," Intelligent Roberts and Systems, 2006 IEEE/RSJ Int'l Conf. on IEEE, PI, Oct. 1, 2006, pp. 4780-4785.

Sep 30, 2013—(EP) Examination Communication—App 08876093.9.

* cited by examiner

METHOD AND SYSTEM FOR PRODUCING MULTI-VIEW 3D VISUAL CONTENTS

CROSS REFERENCE TO RELATED APPLICATIONS

This is a U.S. National Phase Application under 35 U.S.C. 371 of International Application No. PCT/IT2008/000695, filed Nov. 7, 2008, which was published Under PCT Article 21(2), the entire contents of which are incorporated herein by reference.

BACKGROUND OF THE INVENTION

1. Field of the Invention

The present invention relates in general to the techniques for capturing visual contents like images and videos, and more particularly the invention relates to the capturing of visual contents in a way adapted to render a three-dimensional (3D) effect from multiple viewpoints.

2. Discussion of the Related Art 3D visual contents generation and fruition is a promising field of research which is expected to find interesting applications in several fields, like for example making it possible to offer a more true-to-reality experience in inter-personal communications (3D videocommunications/videoconferencing) and new multimedia contents distribution services (e.g., 3D animation).

In the past decade, different approaches and techniques have been proposed, some of which have also been standardized.

However, up to now no solution is available for implementing a complete, end-to-end system at a reasonable cost for the visual contents producer, the contents distributor and the end user.

Typically, a videocommunication system, or, more generally, a system for the distribution of 3D visual contents is made up of an acquisition subsystem, an encoding and distribution subsystem and a display subsystem.

Known techniques for capturing 3D videos from multiple viewpoints exploit an array of videocameras located at different, spaced-apart positions and orientations; a 3D model or depth model of the captured scene can be derived by the different video captures.

Several solutions have been proposed for generating "depth maps" (i.e., maps of the distance of the different points of a captured scene as seen from an observation point) starting from two bidimensional (2D) video captures, captured by two 2D videocameras positioned according to the human stereoscopic view (i.e., emulating the right and left eyes), or starting from generic arrangements of multiple 2D videocameras.

More recently, videocameras have been made available that are capable of acquiring, in real time, and in addition to a bidimensional (2D) view of the scene, information about the scene depth (intended as the distance of the various points of the scene from the videocamera). These "depth cams" exploit techniques based on a measure of the time of flight of laser beams or InfraRed (IR) pulses. An example of videocamera capable of measuring objects distances is for example described in WO 97/01113, US 2007/296721 discloses a contents generating method and apparatus that can support functions of moving object substitution, depth-based object insertion, background image substitution, and view offering upon a user request and provide realistic image by applying lighting information applied to a real image to computer graphics object when a real image is composited with computer graphics object. The apparatus includes: a preprocessing block, a camera calibration block, a scene model generating block, an object extracting/tracing block, a real image/computer graphics object compositing block, an image generating block, and the user interface block.

WO 2008/53417 discloses a system for producing a depth map of a video sequence comprising a client and a server connected by a network. A secondary video sequence available at the client is derived from a primary video sequence available at the server, the primary video sequence having a primary depth map. The server comprises a transmission unit for transmitting the primary depth map to the client. The client comprises an alignment unit for aligning the primary depth map with the secondary video sequence so as to produce alignment information, and a derivation unit for deriving the secondary depth map from the primary depth map using the alignment information.

SUMMARY OF THE INVENTION

The Applicant has observed that the solutions which calls for synthesizing depth maps starting from two 2D video captures are computationally demanding (needing expensive apparatuses with hardware accelerators), and the synthesized depth maps are not accurate.

Depth maps of relatively good accuracy are obtained using depth cams. However, the Applicant, has observed that the measure of the observed scene depth generated by a depth cam depends on various parameters related to the optical measure of the objects distance, and typically each depth cam establishes its own reference scale, which may vary dynamically as the captured scene varies, for representing the depth measure on a range of constant values. According to the Applicant observations, this is due to the fact that the depth cam, in order to operate at the relatively high speeds necessary for a real-time video capture, does not measure directly the flight time of the IR pulses, but rather an average value of detected intensity in a measurement time window which varies according to a fixed emission time window. The detected intensity is then compared to an average intensity value measured in a wider measurement time window, so as to consider absolute changes due to the reflectivity of the objects surfaces and the illumination of the scene. The obtained measure is thus always a ratio between two measured values, and thus it is a relative value on a dynamically variable scale.

The depth maps generated by a depth cam should therefore be converted and equalized, in order to be able to represent the depth of an observed scene on a known and constant scale. Known solutions however do not tackle this problem, assuming instead that the depth maps are already equalized so as to relate to a common scale; this operation is nevertheless not trivial.

Another problem in the use of depth cams is the difficulty encountered when two or more depth cams are employed, because the mutual interference between the light pulses emitted and received by each depth cam would make it essentially impossible the measure of the flight time.

These problems affect for example the solutions disclosed in US 2007/296721 and WO2008/53417

According to a first aspect of the present invention, there is provided a method for producing 3D multi-view visual contents, comprising:

capturing a visual scene from at least one first point of view for generating a first bidimensional image of the scene and a corresponding first depth map indicative of a distance of different parts of the scene from the first point of view;

capturing the visual scene from at least one second point of view for generating a second bidimensional image of the scene;

processing the first bidimensional image to derive at least one predicted second bidimensional image predicting the visual scene captured from the at least one second point of view;

deriving at least one predicted second depth map predictive of a distance of different parts of the scene from the at least one second point of view by processing the first depth map, the at least one predicted second bidimensional image and the second bidimensional image.

Said deriving the at least one predicted second depth map may comprise comparing the at least one predicted second bidimensional image with the at least one second bidimensional image of the scene.

Said generating the first depth map may comprise mapping a detected distance of different parts of the scene from the first point of view onto a scale of values, and wherein said deriving the at least one predicted second depth map comprises varying mapping parameters (q,m) used for said mapping until a matching between said predicted second bidimensional image and the second bidimensional image of the scene is detected.

Said mapping may include performing a transformation of a detected distance of a point of the captured scene into a luminance value of the corresponding pixel, and said varying mapping parameters includes changing parameters for said transformation.

Said comparing may comprise calculating differences between values of the pixels of at least an area within said predicted second bidimensional image and said second bidimensional image.

Said comparing may in particular comprise calculating a cumulated value of said calculated differences between the values of the pixels of said area, and determining a matching between said predicted second bidimensional image and the second bidimensional image of the scene based on the calculated cumulated value.

Said calculating a cumulated value may comprise exploiting information provided by the first depth map to differently-weight the values of different pixels of said area.

The method may comprise performing an initial calibration for determining geometrical parameters defining a geometry under which the scene is respectively seen from the first and second points of view.

The method preferably further comprises correcting jumps and ghost effects in the at least one predicted second bidimensional image.

According to another aspect of the present invention, a system is provided for producing 3D multi-view visual contents, comprising:

at least one first image capturing device arranged for capturing a visual scene from at least one first point of view and capable to generate a first bidimensional image of the scene and a corresponding first depth map indicative of a distance of different parts of the scene from the first point of view;

at least one second image capturing device arranged for capturing the visual scene from at least one second point of view and capable of generating a second bidimensional image of the scene;

an acquisition and processing subsystem operable to:
acquire the first bidimensional image, the first depth map and the second bidimensional image;

process the first bidimensional image to derive at least one predicted second bidimensional image predicting the visual scene captured from the at least one second point of view; and derive at least one predicted second depth map predictive of a distance of different parts of the scene from the at least one second point of view by processing the first depth map, the at least one predicted second bidimensional image and the second bidimensional image.

The system may further comprise a communication channel for distributing the 3D multi-view visual contents.

In an embodiment of the present invention, said acquisition and processing subsystem distributes over said communication channel the first bidimensional image, the first depth map, the second bidimensional image and the at least one predicted second depth map.

In another embodiment of the present invention, said acquisition and processing subsystem comprises:

a first subsystem operable to acquire the first bidimensional image, the first depth map and the second bidimensional image;

to process the first bidimensional image to calculate prediction parameters useful to derive at least one predicted second bidimensional image predicting the visual scene captured from the at leas one second point of view; and and further operable to distribute over the communication channel the first bidimensional image, the first depth map, the second bidimensional image and the calculated prediction parameters;

and a second subsystem operable to receive, from the first subsystem and over said communication channel, the first bidimensional image, the first depth map, the second bidimensional image and the calculated prediction parameters at least one predicted second depth map, and further operable to derive at least one predicted second depth map predictive of a distance of different parts of the scene from the at least one second point of view by processing the first depth map, the at least one predicted second bidimensional image and the second bidimensional image based on the prediction parameters.

The first depth map may comprise a mapping of a detected distance of different parts of the scene from the first point of view onto a scale of values, and said at least one predicted second depth map may be derived by varying mapping parameters used for said mapping until a matching between said predicted second bidimensional image and the second bidimensional image of the scene is detected.

According to still another aspect of the present invention, a computer program loadable into a data processor is provided, comprising computer program code modules adapted to perform, when the computer program is executed by the data processor, the steps of the method defined above.

BRIEF DESCRIPTION OF THE DRAWINGS

These and other features and advantages of the present invention will be made evident by the following detailed description of some exemplary and non-limitative embodiments thereof, to be read in conjunction with the attached drawings, wherein.

DETAILED DESCRIPTION OF EMBODIMENTS OF THE PRESENT INVENTION

Figure 1:
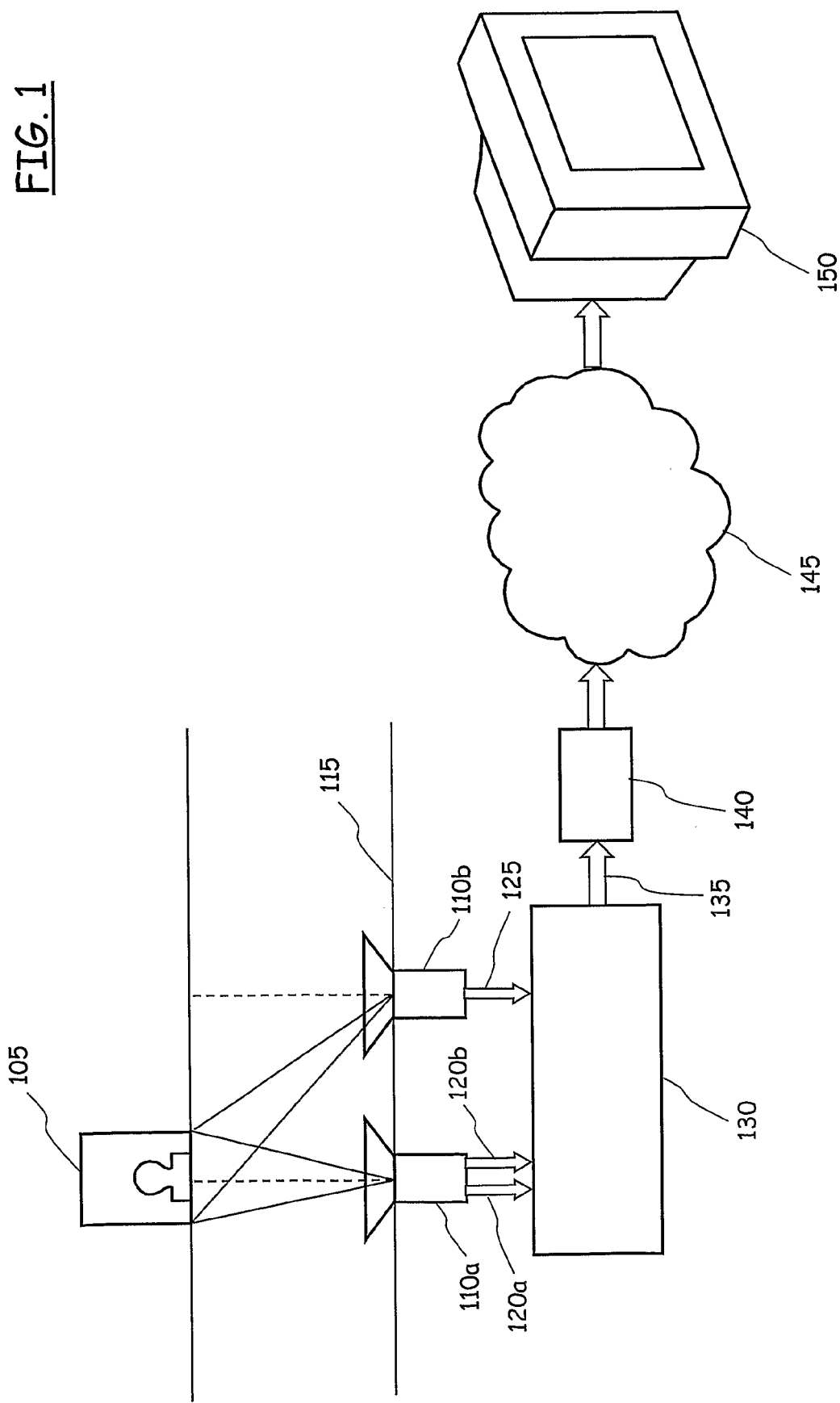
FIG. 1 schematically shows a system according to an embodiment of the present invention, with an exemplary arrangement of two videocameras.

Making reference to the drawings, in FIG. 1 there is schematically shown an exemplary system according to an embodiment of the present invention, for the acquisition and distribution of multi-view 3D video contents, adapted to be used for, e.g., videocommunications or videoconferencing.

Reference numeral 105 denotes a scene of which a video is to be captured; the scene 105 may for example include a speaking person (i.e., a speaker).

The exemplary multi-view 3D video acquisition system shown in the drawing comprises an arrangement of videocameras, particularly, in the example shown, two videocameras 100a and 110b. The two videocameras 110a and 110b are placed at a distance from the scene 105 to be recorded, and, in the exemplary embodiment considered, they are spaced apart from each other a prescribed distance along a line 115, so as to observe the scene 105 from two different points of view.

The videocamera 110a is a depth cam, i.e. a videocamera capable of generating a sequence 120a of 2D video frames of the scene 105, for example color video frames, which may for example be based on the RGB (Red-Green-Blue) color model, and information about the depth of the observed scene 105, i.e. information about the distance, from the point of view of the videocamera 110a, of different parts of the scene 105.

In particular, the scene depth information generated by the depth cam 110a takes the form of a sequence 120b of depth maps, which are associated to the 2D video frames 120a (for example, a depth map may be associated to each 2D video frame, or one depth map may be associated to groups of two or more 2D video frames); even more particularly, the sequence 120b of depth maps may take the form of a sequence of video frames, e.g. in gray scale, according to which, for example, the parts of the scene which are closest to the videocamera 110a are represented in gray levels close or equal to the white, whereas the most distant parts of the scene are represented in gray levels close or equal to the black. The depth maps are associated with the 2D video frames of the sequence 120a, and different levels of gray in the depth maps correspond to different depths of the scene 105, i.e. different distances of the scene 105 parts as measured by the videocamera 110a.

Figure 2:
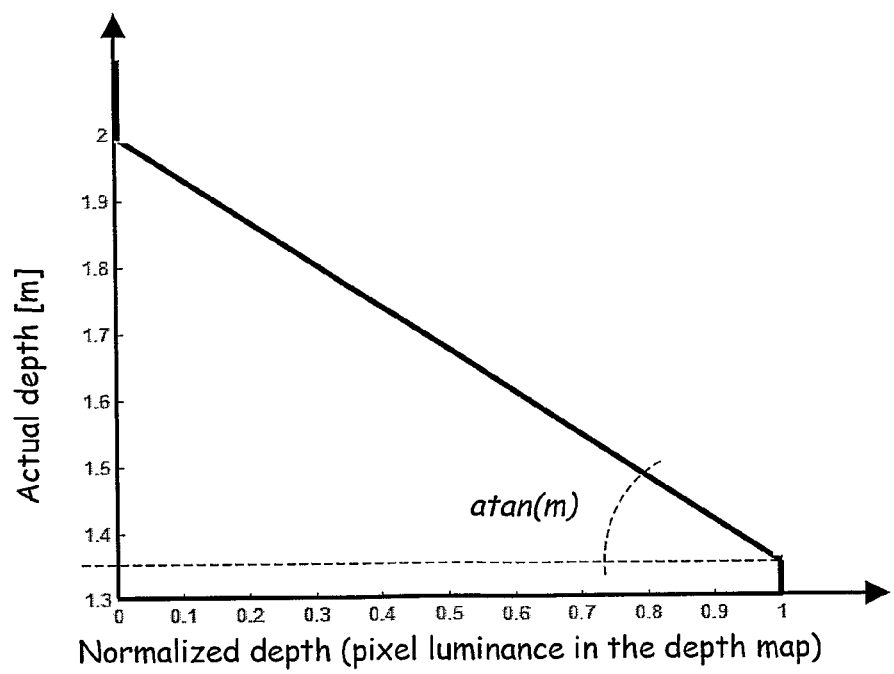
FIG. 2 is a diagram of an exemplary mapping of measured depth of an observed scene (in ordinate, unit [m]), onto normalized pixel luminance values (in abscissa)

More specifically, considering the generic frame in the sequence 120b of depth maps, pixels thereof which correspond to parts of the scene 105 at different distances from the point of view of the depth cam 110a have different values of luminance, and in particular the luminance values of pixels corresponding to parts of the scene 105 which are closer to the point of view of the depth cam 110a are higher than the luminance values of pixels corresponding to parts of the scene that are more distant from the depth cam 110a (i.e., parts of the scene 105 that have a greater depth). In a depth cam, the mapping of the measured distances of the different parts of the scene 105 onto the grey levels scale is typically accomplished based on a direct proportionality relationship, mathematically described by the following linear function:

$$D = q - m^* \text{depth}$$

where D is the actual depth of a generic point of the scene 105 (i.e. the distance, e.g., in meters, measured by the depth cam of the pixel from the observation point of the depth cam), depth is the representation of the depth of the corresponding pixel in the video frame in terms of levels of gray, and q and m are the parameters of the linear function; the above relationship is graphically represented in FIG. 2, where the abscissa reports the normalized value depth represented as a pixel luminance in the depth map, ranging from 0 to 1 (the normalization allows making the expression independent from the peculiar representation of the pixel color/luminosity adopted in the depth map, e.g. independent from the number of bits used for representing the pixel luminance), whereas the ordinate reports the actual depth D, e.g. in meters. According to the considered, exemplary convention, irrespectively of the number of bits exploited for representing a pixel's luminance value, the value 1 of the pixel luminance corresponds to the minimum distance of the corresponding point of the scene 105 from the depth cam, while the value 0 corresponds to the maximum distance. The mapping of the actual depth to the luminance value of the generic pixel is strongly related to the values of the parameters q and m.

Referring back to FIG. 1, the videocamera 110b is a normal 2D cam, capable of generating a sequence 125 of 2D video frames of the scene 105, as visible from its viewpoint, for example color video frames, e.g. based on the RGB color model.

The sequences of frames 120a, 120b and 125 are inputted to an acquisition and processing subsystem 130, operable to acquire the frame sequences and process them as described in detail later, and to consequently generate a multi-view 3D video content 135.

The multi-view 3D video content 135 is then encoded by an encoder 140 in any suitable format, for example H264-MVC or MPEG-C, and is distributed, through a distribution channel 145, e.g. an IP (Internet Protocol) network like the Internet, to a user, to be displayed on a 3D display device 150, e.g. a 3D monitor or TV set.

Figure 3:
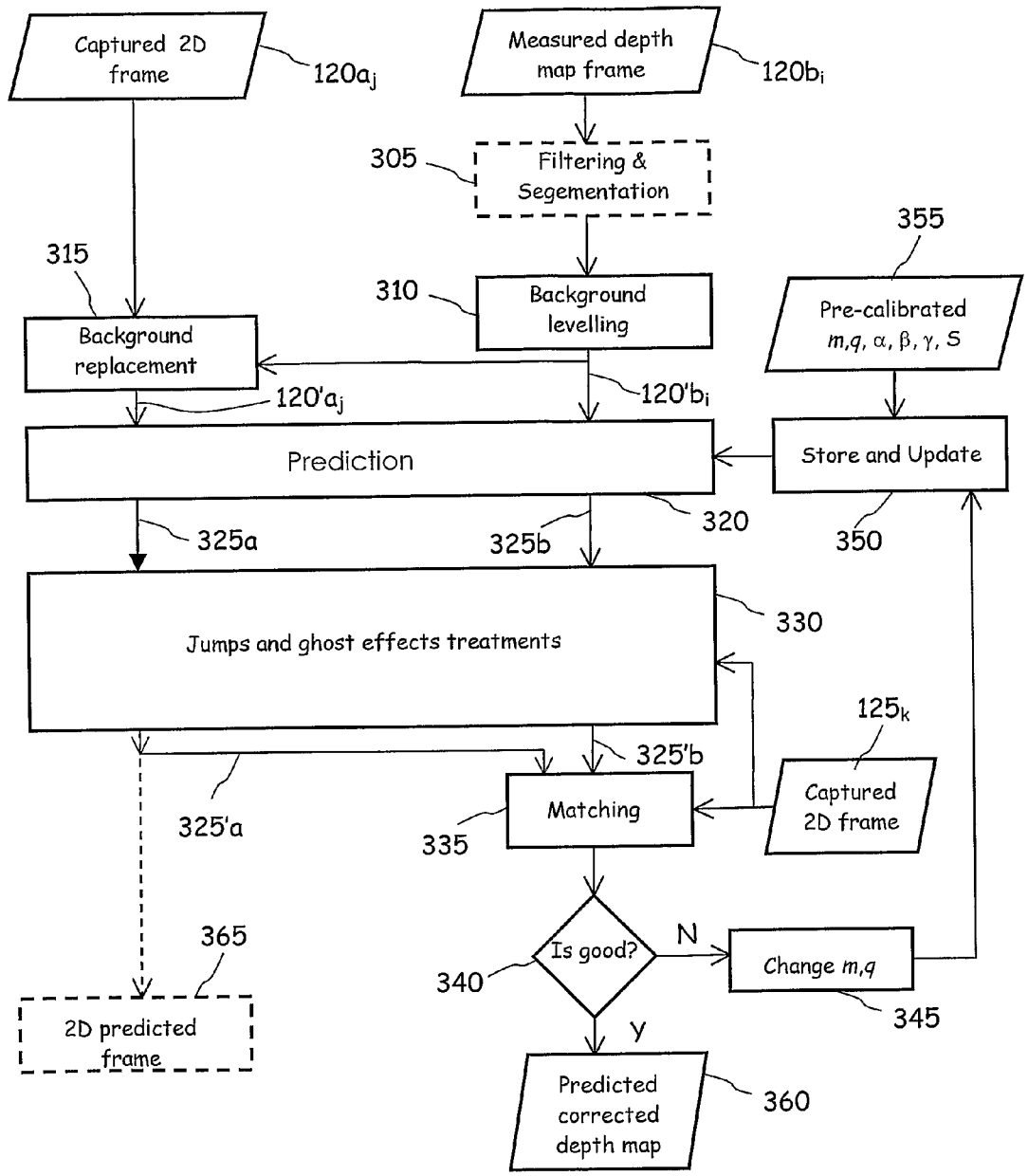
FIG. 3 schematically shows a flowchart of a method according to an embodiment of the present invention for the predictive generation of depth maps.

FIG. 3 is a schematic flowchart of a method according to an embodiment of the present invention implemented by the acquisition and processing subsystem 130 for generating a multi-view 3D video content 135.

The acquisition and processing subsystem 130 receives the two frame sequences 120a and 120b generated by the depth cam 110a. The operations which will be described hereinafter are performed on each frame of the two frame sequences 120a and 120b.

The generic frame $120b_i$ of the sequence 120b containing the depth map of the scene 105 is preferably submitted to an image filtering process and to a segmentation process (block 305); the image filtering process is directed to filter the gray-scale 2D image so as to eliminate noise phenomena that may me present in particular along the contours of the objects in the scene 105. The segmentation process is directed to recognize different parts of the scene 105 (e.g., a speaker in foreground, a scene background, objects located aside or behind the speaker, etc.), and to assign to the identified scene parts essentially uniform, homogeneous levels of grey. By submitting the depth map frame $120b_i$ to the filtering and segmentation processes, the different levels of gray present in the gray-scale 2D frame can be reduced in number, and areas with substantially homogeneous gray levels (i.e., parts of the scene located at essentially equal distances from the point of view of the depth cam 110a) are obtained, which simplifies the subsequent processing. However, it is pointed out that neither the image filtering nor the segmentation processes are essential to the present invention, and may be dispensed for, for example in those cases where the computational power of the acquisition and processing subsystem 130 is not a limitation and the prediction process described in the foregoing can be performed also on non-filtered and non-segmented images.

After having been subjected to the filtering and segmentation processes, the frame $120b_i$ of the sequence 120b is preferably subjected to a background leveling operation (block 310). This operation allows eliminating, even after the image segmentation, possible noise phenomena associated with the acquisition of the depth map, due for example to the contrast (determined by the limited depth range measurement capabilities of the videocamera 110a) between the measured depths of an object present in the scene 105 and the scene 105 background. The background leveling operation may involve processing the value (gray level) of each pixel in the frame $120b_i$ for setting the gray level of those pixels corresponding to parts of the scene 105 close to the maximum scene distance equal to the gray level associated to the maximum distance (e.g., the black). In this way, the gray level of the scene background is rendered substantially uniform (all the frame pixels identified as belonging to the scene background are assigned a same grey level, corresponding to the maximum distance).

As a consequence of the operations of image filtering, segmentation and background leveling, the original frame $120b_i$ of the sequence 120b is modified in such a way that the values (gray levels) of its pixels are essentially uniform both in respect of the scene 105 background and in respect of other, different parts of the scene 105 located at similar distances (i.e., the scene background and the different parts of the scene located at similar distances are assigned respective, essentially homogeneous depth values). The modified frame $120'b_i$ thus obtained is exploited to remove the background from the corresponding frame $120a_j$ in the sequence 120a (i.e., the 2D color frame) and to replace the removed background with a predetermined background (block 315). This allows significantly reducing the number of pixels to be processed in the subsequent operations (the pixels corresponding to the scene background can for example be neglected in the subsequent processing), thereby reducing the computational burden. This simplification has no impact on the quality of the result to be achieved, because in the practice a depth cam has a limited depth acquisition range, so that it is incapable of discriminating the distances of parts of the scene greater than a maximum distance; pixels of the 2D color frame $120a_j$ corresponding to parts of the scene 105 beyond the maximum distance are essentially indistinguishable in the depth map.

Based on the modified frames $120'a_j$ and $120b_i$ of the two sequences 120a and 120b, modified as discussed above, a prediction of the image as seen from the viewpoint of the videocamera 110b is calculated (block 320). In particular, the prediction is a geometric prediction, and is directed to obtain a predicted 2D color image frame 325a and an associated predicted depth map frame 325b. The operations performed to calculate the predicted frames 325a and 325b are described in detail later. In particular, the values of the parameters q and m of the linear function D=q−m*depth applied by the depth cam 110a to map the measured depth of the generic point of the scene 105 onto a normalized luminance value of the corresponding pixel of the depth map affect the result of the prediction; initially, tentative values for the parameters q and m are used, calculated for example in a pre-calibration phase of the system (block 355), the pre-calibration phase being discussed in detail later.

The prediction of the depth map frame 325b is qualitatively less critical compared to the prediction of the 2D color image frame 325a, because the latter is characterized by many more variations and discontinuities, and is thus more prone to noise and sensitive to prediction errors or approximations (due for example to jump and ghost effects, discussed in greater detail later).

The calculated predictions are for this reason corrected (block 330), as described in detail later; for the correction, the 2D video frame $125_k$ of the sequence 125 generated by the 2D videocamera 110b is exploited. A corrected predicted 2D frame $325'a$ and a corrected predicted depth map frame $325'b$ are thus obtained.

The corrected predicted 2D frame $325'a$ is then compared to the 2D video frame $125_k$ of the sequence 125 generated by the 2D videocamera 110b (block 335), so as to match the two images; in the matching process, the predicted (and corrected) depth map frame $325'b$ may be exploited (as discussed later). The operations of calculation of the predicted 2D color image 325a and of the associated predicted depth map 325b (block 320), correction thereof to remove jumps and ghost effects (block 330) and of matching between the corrected predicted 2D video frame $325'a$ and the 2D video frame $125_k$ of the sequence 125 generated by the 2D videocamera 110b (block 335) are iterated until a satisfactory matching is attained (block 340, exit branches Y—satisfactory matching—or N—unsatisfactory matching); at each iteration, the values of the parameters q and m of the linear function D=q−m*depth applied by the depth cam 110a to map the measured depth of the generic point of the scene 105 onto a normalized luminance value of the corresponding pixel of the depth map are changed (block 345), and the updated values of the parameters q and m are stored (block 350); the use of different values of the parameters q and m leads to different predicted frames. As mentioned above, at the first iteration the values of the parameters q and m used in the prediction calculations are those (block 355) determined in a pre-calibration phase of the system.

Once a satisfactory matching between the predicted 2D video frame $325'a$ and the 2D video frame $125_k$ of the sequence 125 generated by the 2D videocamera 110b is achieved (exit branch Y of block 340), a predicted depth map 360 is obtained that corresponds to the 2D video frame taken by the 2D videocamera 110b from its point of view; a predicted 2D video frame 365 for the observation point of the 2D videocamera 110b is also available.

In the following, some of the steps of the method outlined above will be described in detail.

Prediction (Block 330)

For the geometric prediction of the depth map frame 325b and of the 2D image frame 325a, the parameters q and m of the linear function D=q−m*depth applied by the depth cam 110a to map the measured depth of the generic point of the scene 105 onto a normalized luminance value of the corresponding pixel of the depth map are used. Additionally, geometric parameters defining the position and the relative alignment of the two videocameras 110a and 110b are required, in order to properly determine the perspective under which the scene 105 is seen from the point of view of the videocamera 110b.

As mentioned in the foregoing, the mapping of the actual distance of the different parts of the scene 105 onto the values of luminance (i.e., gray levels) of the corresponding pixels in the depth map strongly depends on the values of the parameters q and m; the values of these two parameters strongly affect the calculated prediction of the 2D color image 325a and of the associated depth map 325b as seen from the point of view of the 2D videocamera 110b. In particular, the value of the parameter q affects the value of the depth within the depth measurement range of the depth cam 110b, while the value of the parameter m affects the perspective widening or narrowing of the generic pixel, and thus of the objects present in the scene 150.

Figure 4:
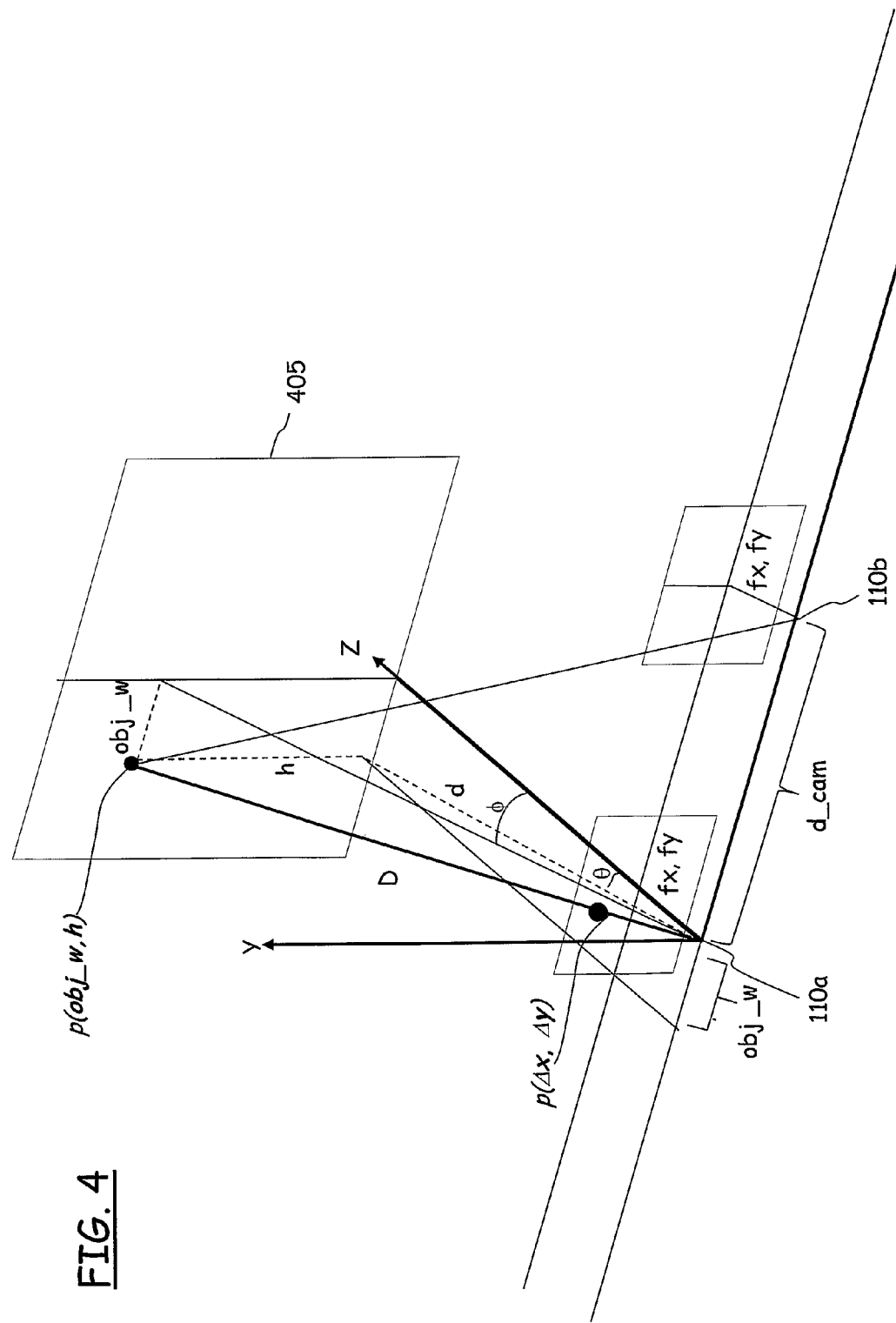
FIG. 4 schematically shows the 3D geometrical depth map prediction inherent to the capturing of a scene with the exemplary two videocameras arrangement of FIG. 1.

For the geometric prediction, a system of coordinates is defined. A suitable system of coordinates is a three-axis Cartesian coordinate system; for simplifying the calculations, it is convenient to set the position of the videocamera 110a as the origin of the coordinate system, as shown in FIG. 4. The X axis is along the direction of the line joining the two videocameras 110a and 110b, the Z axis is directed orthogonally to the plane of recording of the depth cam 110a, and the Y axis is orthogonal to the other two axes.

Figure 5:
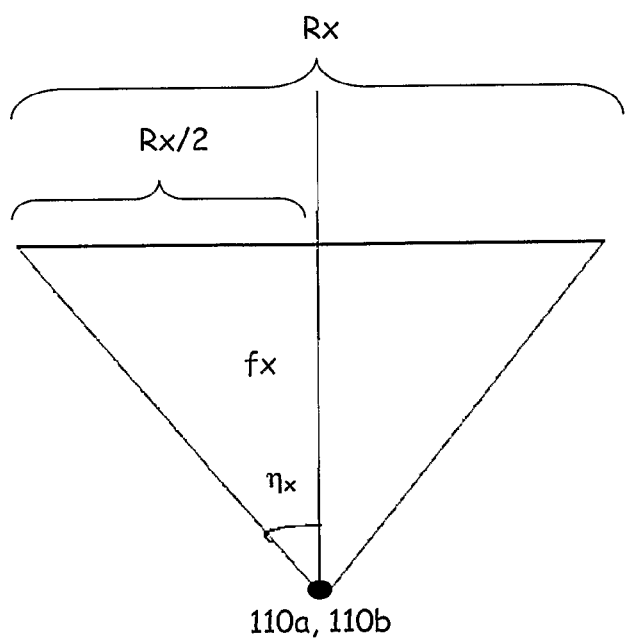
FIG. 5 shows the geometrical parameters defining a horizontal focal distance of a videocamera.

Let the quantities fx and fy denote the focal distances, along the X axis and the Y axis, expressed as a number of pixels and measured as the distances corresponding to the focus of view of the scene 105, under the assumption that the generic videocamera corresponds to a geometric point; FIG. 5 shows the geometric parameters relevant for the calculation of the quantity fx (similar considerations apply to the quantity fy). The values of the quantities fx and fy depend on the resolution Rx, Ry along the X and Y axes of the image acquired by the videocamera, normalized to the maximum angular aperture of the videocamera; $\eta_x$ and $\eta_y$ are the horizontal and vertical aperture angles, respectively. The quantities fx and fy are calculated, during the system pre-calibration phase, as follows:

$$fx = \frac{Rx/2}{tg\eta x}, \; fy = \frac{Ry/2}{tg\eta y}$$

Considering the configuration depicted in FIG. 4, for each pixel the angles $\Theta$, $\phi$ subtended by the considered pixel on the image plane 405 with respect to the axis Z, and measured in the planes {YZ} and {XZ} are calculated:

$$\theta = \arctg\left(\frac{\Delta x}{fx}\right), \; \varphi = \arctg\left(\frac{\Delta y}{fy}\right)$$

where $\Delta x$ and $\Delta y$ are the coordinates (in pixels) of the considered pixel p($\Delta x$, $\Delta y$) with respect to the center of the image, located on the Z axis of the system of coordinates used for calculating the focal distances fx and fy.

Based on geometrical considerations, the following expression is obtained:

$$\left(\frac{z}{\cos\theta}\right)^2 + (ztg\varphi)^2 = D^2$$

from which, known the values of the angles $\Theta$, $\phi$ and the measure of the distance D, i.e. the depth provided by the depth cam 110a, it is possible to calculate the value of the coordinate z.

Figure 6:
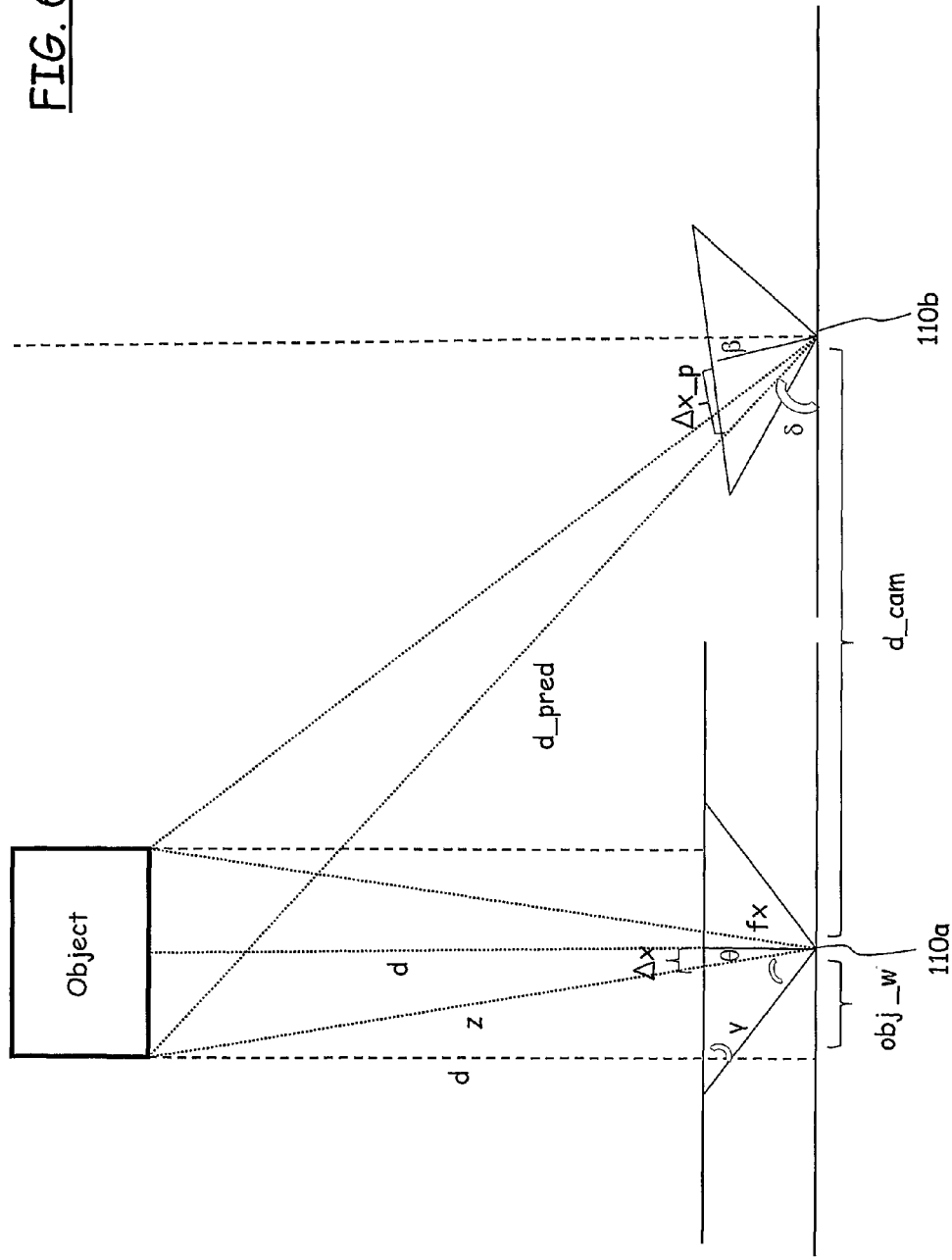
FIG. 6 schematically shows the 3D geometrical configuration parameters inherent to the capturing of a scene with the exemplary two videocameras arrangement of FIG. 1 in the horizontal direction (plane {X,Z} of FIG. 4)

Considering, for the sake of simplicity, the prediction made for the horizontal direction only, and thus considering the projection and the analysis of the scene 105 along the X axis of the coordinate system, the reference scheme depicted in FIG. 6 is obtained (projection of the reference scheme of FIG. 4 onto the plane {XZ}). There are several geometric parameters that are inherent to the scene being acquired and that should be defined in order to make a good prediction. In particular, the geometric parameters to be considered include, in addition to the focal distances fx and fy related to the depth cam 110a, the distance d_cam between the two videocameras 110a and 110b, and the angle $\alpha$ expressing the inclination of the videocamera 110b in the plane {XZ} with respect to the direction orthogonal to the horizon of the scene to be captured (i.e. the Z axis). Known the focal distance fx for the depth cam 110a and the value $\Delta x$ expressed in pixels as a function of the chosen resolution, it is possible to geometrically derive the value obj_w expressing, in conventional units, the actual width of an observed object in the scene 105, through the formula:

obj_w=z*tan($\Theta$).

In these conditions, it is also possible to derive the depth value d_pred predicted geometrically for the second point of view (that of the videocamera 110b), as follows:

d_pred=sqrt($z^2$+(d_cam+obj_w)$^2$).

Once the predicted depth value d_pred for the second point of view is calculated for every pixel, the value $\Delta x\_p$ of the abscissa of the pixel matrix is calculated (this value is necessary for properly positioning the value of the calculated pixel within the resolution of the videocamera 110b). The value $\Delta x\_p$ is calculated as follows:

$\Delta x\_p$=round(tan($\pi$/2−$\delta$−$\alpha$)*fx)

where the angle $\delta$ is computed as:

$\delta$=a tan(z/(obj_w+d_cam))

Once the correct position for the pixel along the second line of sight has been determined, the value of the pixel of the 2D frame 120$a_j$ captured by the depth cam 110a is copied for the calculation of the predicted 2D video frame, while the predicted depth value d_pred is taken for the generation of the predicted depth map. Similar considerations apply for the prediction along the Y axis.

In this way, a predicted 2D video frame 325a and a predicted depth map 325b are generated in respect of the point of view of the videocamera 110b.

Jumps and Ghost Effects Treatment

As mentioned in the foregoing, jumps and ghost effects may be present in the predicted video frame.

Figure 7:
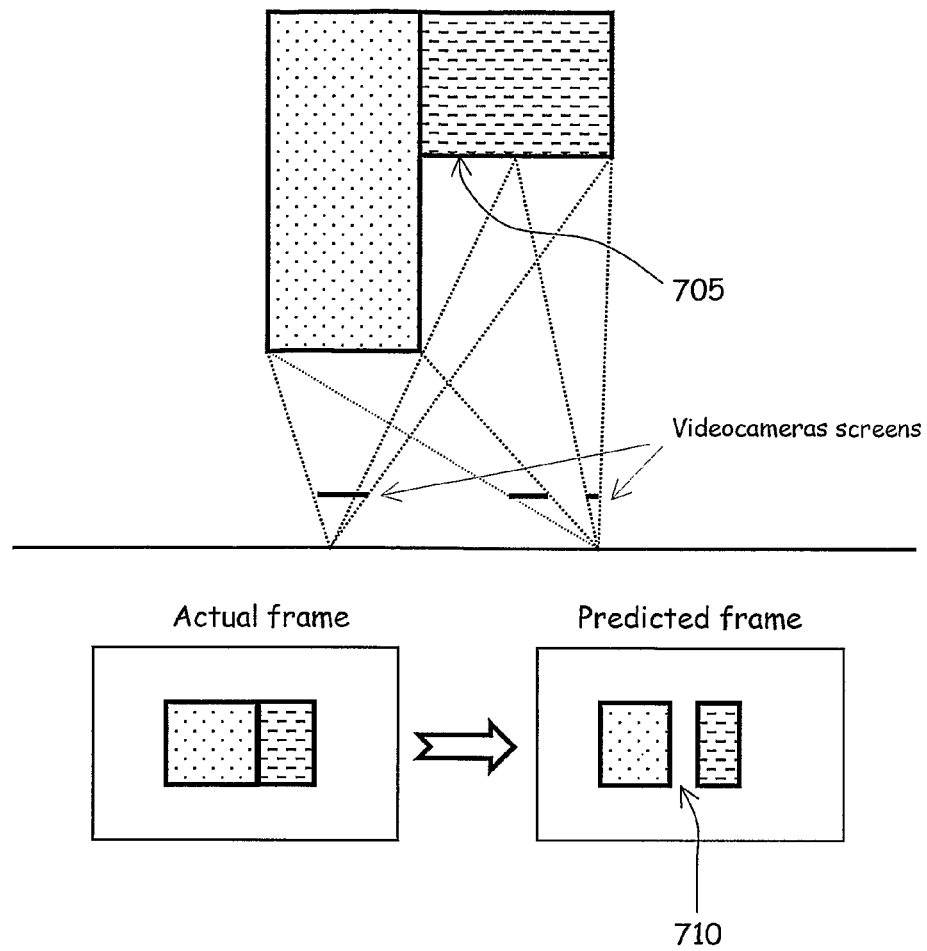
FIG. 7 shows an exemplary jump effect in a predicted depth map.

In particular, jumps correspond to discontinuities in the predicted image, caused by the existence of occluded areas which are not visible from the point of view of the depth cam 110a, being instead visible from the point of view of the videocamera 110b; an exemplary case of occluded area that may generate a jump is shown in FIG. 7; the area 705 is not visible from the viewpoint of the depth cam 110a, being instead visible from the viewpoint of the videocamera 110b; this area corresponds to a jump 710 in the predicted image. This kind of effect depends on geometric parameters of the video acquisition set-up and on the morphology of the objects included in the captured scene, and cannot be eliminated a priori because it is due to limitations in the observable parts of the scene as viewed from different observation angles.

Figure 8:
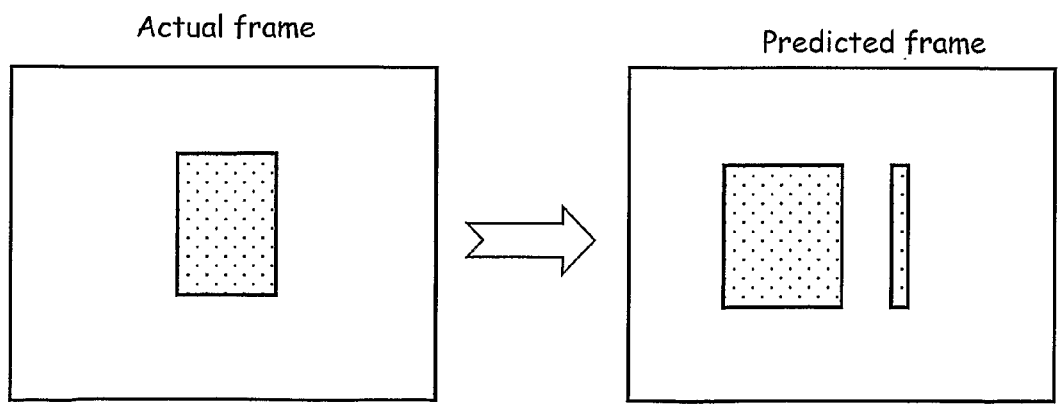
FIG. 8 shows an exemplary ghost effect in a predicted depth map.

Ghost effects correspond to artefacts of different nature, caused by imprecision and errors in the depth map. These effects cause as well discontinuities in the prediction, but are typically encountered on the contours of the objects with respect to a relatively distant background. An example of ghost effect is depicted in FIG. 8.

Figure 9:
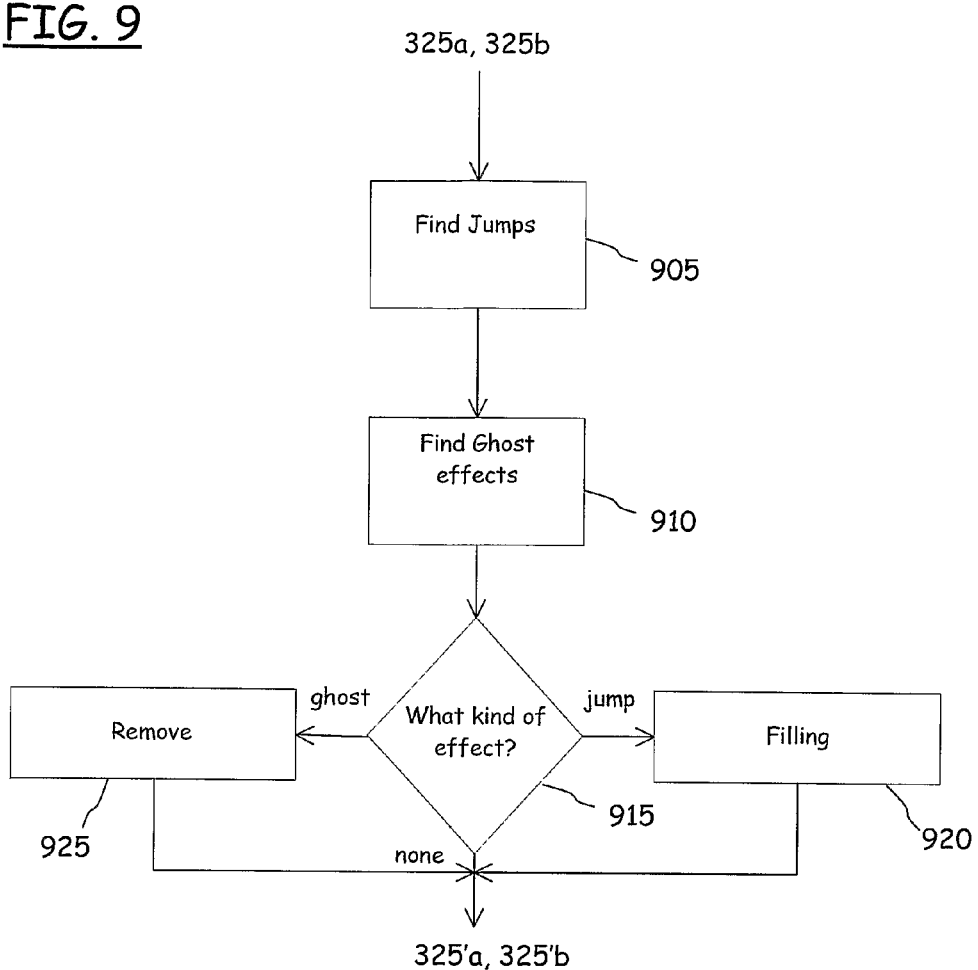
FIG. 9 is a schematic flowchart of a procedure according to an embodiment of the present invention for treating jumps and ghost effects.

According to an embodiment of the present invention, as schematically depicted in the flowchart of FIG. 9, jumps and ghost effects in the predicted frames 325a and 325b are treated by creating a matrix containing the information about those pixels of the predicted frames that are affected by these effects, i.e. that have not been correctly predicted. Jumps and ghost effects are searched (blocks 905 and 910). The actions undertaken depend on the nature of the effect (block 915). In particular, a filling operation on the predicted 2D video frame 325a and on the predicted depth map 325b is performed (block 920) where areas affected by jump effects are identified, whereas those areas that are identified as affected by ghost effects are removed (block 925), by setting the values of the pixels in these areas equal to the value of the background, or of the scene object immediately behind, so as to make the scene or the region affected by these phenomena more homogeneous.

In greater detail, a noise threshold is set that is adapted to enable identifying regions of the depth map, in correspondence to object contours, exhibiting excessive differences of depth (optionally checking also that these differences are within a region similar to the object contour, thus having a small width along the X or the Y axis); the pixels thus identified are assigned a luminance value equal to that of the background, and they are tagged as "forbidden", so as to be excluded from the prediction calculations at every iteration of the operations flow of FIG. 3. During the prediction phase, the existence of jumps in the predicted frames is observed, and the values of the deltas in the measured depth are stored. In case the difference in depth exceeds the noise threshold, the corresponding pixel in the original depth map is analysed: if the pixel in the predicted depth map corresponds to an area, in the originally acquired depth map, which is noisy, i.e. an area whose pixels are tagged as "forbidden", the predicted pixel is regarded as a ghost effect, and consequently its predicted value is replaced by a value corresponding to that of the background. If instead the predicted pixel corresponds to a "non-forbidden" area in the original depth map, the predicted pixel is regarded as affected by a jump phenomenon due to a change in the observation perspective, and a filling operation is performed, that involves assigning to the area of the pixel one or more luminance values obtained by, e.g., geometric interpolation, or estimations of resemblance, or by statistical analysis taking into account the depths of the adjacent areas. The Applicant has found that a good approximation is attained by taking, as the value to be assigned to the pixel, the average value or a linear interpolation of the depth values at the borders of the jump area.

Other techniques can be used for eliminating areas affected by jumps and ghost effects in the predicted frames. For example, the 2D video frame $125_k$ captured by the 2D videocamera 110b can be exploited for estimating, by resemblance of colour or luminosity with adjacent areas, a value to be assigned to the predicted depth map. Another technique may be based on the observation of the 2D video frame $120a_j$ taken by the depth cam 110a, with the purpose of identifying the pixels potentially affected by ghost effects by observing the areas affected by noise in the depth map $120b_i$ in relation to the corresponding areas in the 2D video frame $120a_j$ in fact, if a noisy area in the depth map $120b_i$ corresponds to an area resembling the background also in the 2D video frame $120a_j$, the corresponding pixels are tagged as "forbidden", so as not to be considered in the prediction.

Matching

Figure 10:
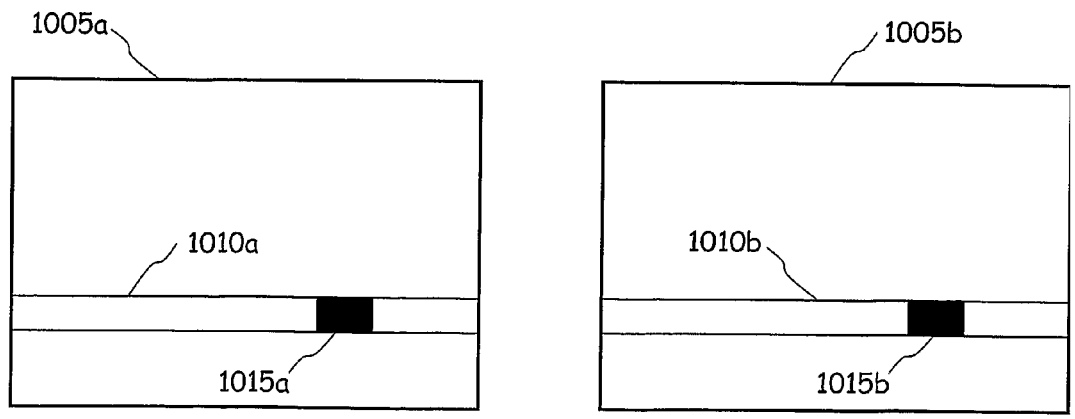
FIG. 10 schematically shows exemplary characteristic areas of an image used in a matching procedure for assessing a matching between a captured 2D image and a predicted 2D image, for the generation of a predicted depth map.

The matching operations carry out the alignment of the predicted (and corrected) depth map 325'b to the actual 2D video frame $125_k$ acquired by the videocamera 110b. One or more characteristic areas in the two frames to match are selected; for example, a characteristic area can be an area exhibiting a variation in colour or luminosity, or an area including peculiar features in the colour or luminosity distribution (such as higher-order standardized moments); in an embodiment of the present invention, such area is an horizontal stripe of contiguous pixels (e.g., a rectangular matrix of pixels), preferably selected so as to include a relatively low number of "forbidden" pixels, i.e. pixels not to be considered for the prediction, as schematically depicted in FIG. 10, wherein 1005a and 1005b denote the 2D predicted frame 325'a and the actual 2D frame $125_k$, respectively, 1010a and 1010b denote an area of the two frames 1005a and 1005b selected for the matching, and 1015a and 1015b denote an area, within the regions selected for the matching, of "forbidden" pixels, not to be considered.

By performing a pixel-by-pixel subtraction of the values of the pixels in the two characteristic areas of the two frames 325'a and $125_k$ to match, a cost function is calculated which depends on the values of the parameters q and m defined in the foregoing; a minimum of the cost function correspond to a best alignment between the two frames 325'a and $125_k$. In order to minimize the cost function value, and to facilitate the search for its minimum, the value assigned to the pixels in the predicted frame 325'a which belong to the scene background during the background replacement operation should be properly selected.

Assuming to adopt an error function based on the difference between the pixel values, an example of cost function is the following:

$$\text{cost}(m, q) = \sum \frac{\alpha_i (p_i - p_r)}{\sum \alpha_i}$$

where the summations are made over all the pixels of the characteristic area, $p_i$ is the value of the pixel of the 2D predicted frame 325'a, and pr is the value of the pixel in the 2D video frame $125_k$ acquired by the 2D videocamera 110b; in an embodiment of the present invention, the coefficient $\alpha_i$ takes value 0 if the pixel considered belongs to a forbidden region in the characteristic area considered for the matching, and 1 otherwise. A different implementation can use for the parameter $\alpha_i$ the value of predicted depth of the pixel in the predicted depth map 325'b, normalized so as to take values between 0 (to represent the background), and 1 (to represent the shortest distance from the point f observation of the scene); in this way the cost is effectively weighted by the estimated depth, giving greater importance to the objects close to the camera (i.e., those in respect of which the measured distance provided by the depth cam is more precise) compared to those objects far from the depth cam (i.e., those in respect of which the measured distance provided by the depth cam is less precise), assigning weight 0 to the background pixels, and ignoring at the same time all the pixels belonging to "forbidden areas". In this way, the matching assigns more importance to the pixels belonging to foreground parts of the scene, thereby ensuring a better visualization and depth rendering of the same. The cost function cost (m,n) is normalized, since there is a multiplication and division for the overall number of pixels actually considered for calculating the value of the cost function (excluding those pixels affected by jumps or ghost effects and thus correctly weighting the calculated value of the cost function).

Varying the values of the parameters q and m, when a minimum for the calculated cost function cost (m,q) is found, or when the calculated cost function value is below a predetermined threshold, a good correspondence between the predicted frame and the captured frame can be declared, and the matching predicted depth map 360 is provided in output, together with a matching predicted 2D frame 365.

Other functions are possible for the matching, using for example the search for the correlation by means of convolution calculations.

In some embodiments of the present invention, the background of the scene is not neglected in the prediction; this may for example be the case when the geometric calibration of the system is particularly accurate. In this case, a depth value S is assigned to the pixels of the scene background, where the value S is selected in order to achieve a good minimization of the cost function used in the matching phase. The depth value S for the background pixels may be established during the calibration phase.

In alternative embodiments, the pixels of the scene background may be tagged as "forbidden", so as not to be considered in the matching; the search for the minimum of the cost function value is conducted considering only the pixels belonging to foreground parts of the scene (in respect of which a good prediction is possible, based on the depth measurement provided by the depth cam).

System Calibration

In the initial calibration of the system the initial values of the parameters q and m and of other geometric parameters are set, such as the inclination of the videocamera 105b (which can be defined by means of an angle $\alpha$ of inclination in respect of the plane $\{X,Z\}$, an angle $\beta$ of inclination in respect of the plane $\{Y,Z\}$, and an angle $\gamma$ of inclination in respect of the plane $\{X,Y\}$), the mutual distance of the two videocameras 105a, 105b along the three axes X, Y, Z of the coordinate system, a fixed depth value S to be assigned to the parts of the scene in background.

Figure 11:
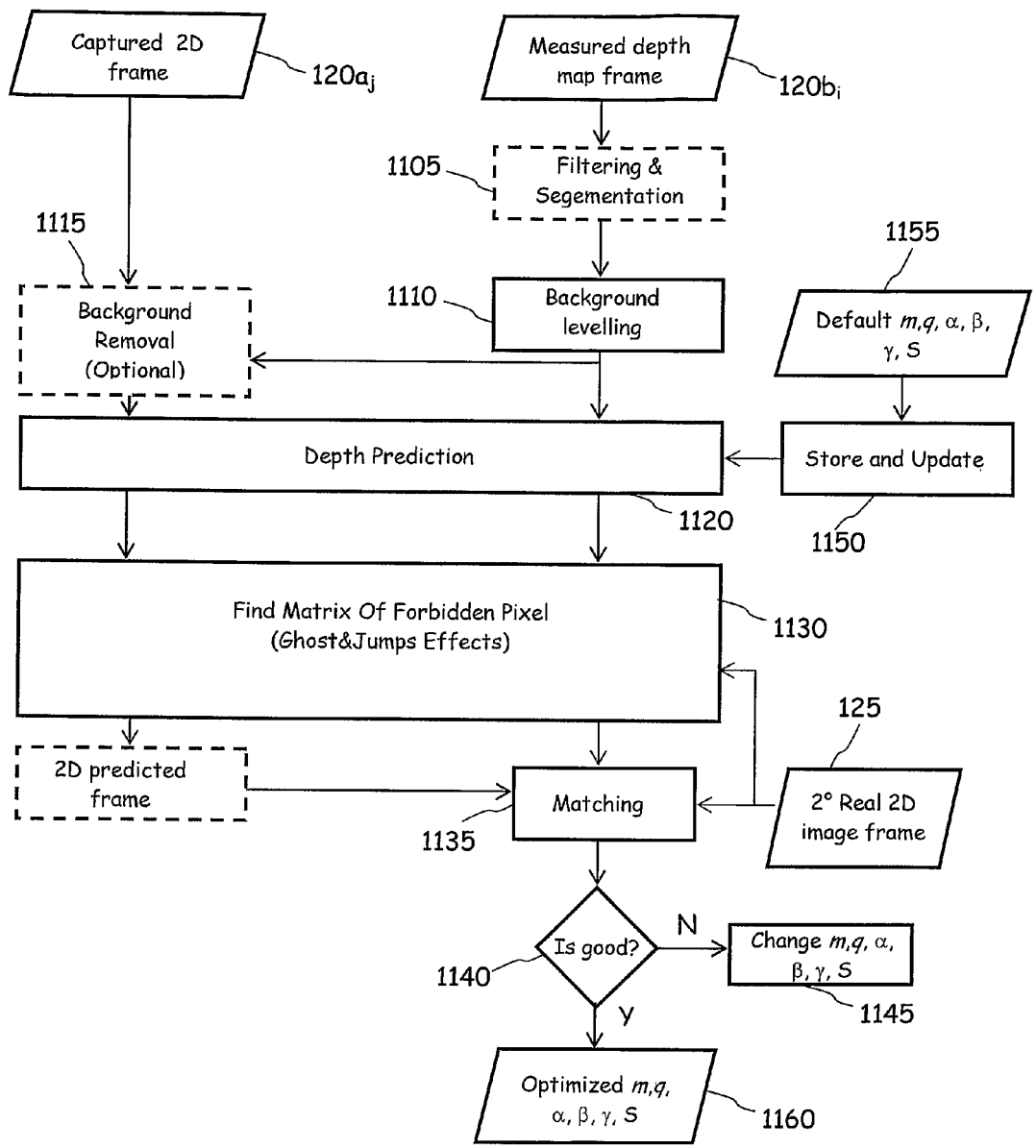
FIG. 11 is a schematic flowchart of a calibration procedure for calibrating the system of FIG. 1.

FIG. 11 schematically depicts a flowchart of a calibration procedure according to an embodiment of the present invention. The flowchart of FIG. 11 is similar to that of FIG. 3, and blocks 1105, 1110, 1115, 1120, 1130, 1135, 1140, 1145 correspond to blocks 305, 310, 315, 320, 330, 335, 340 and 345, respectively. Individual frames 120a and 120b generated by the depth cam 110a are the input to the calibration procedure. The outcome of the calibration procedure are the values to be assigned to the parameters q, m, $\alpha$, $\beta$, $\gamma$, S. In block 1130, differently from block 330, areas of the frames affected by jumps and ghost effects are identified and the corresponding pixels are tagged as "forbidden" (to prevent them from being considered in the matching operation—block 1140), without however performing the actions of filling and removal described in connection with block 330. Also in this case, an iterative procedure is performed, starting—for the operation of prediction, block 320—with default values for the parameters q, m, $\alpha$, $\beta$, $\gamma$, S (block 1155), directed to minimize a cost function changing the parameters values (block 1145). The result of the pre-calibration are optimized values for the parameters q, m, $\alpha$, $\beta$, $\gamma$, S (block 1160) that are used in the subsequent processing (FIG. 3).

The solution according to the present invention can be adopted for realizing flexible real-time multi-view 3D video acquisition systems, capable of generating depth information in the form of sequences of depth maps at the rate of the 2D video frame sequences. The generated sequences of depth maps are associated with the sequences of 2D video frames captured by one or more conventional 2D videocameras, or by other depth cams. The predicted sequences of 2D video frames and of associated depth maps can also correspond to one or more virtual points of views, where no videocamera is present.

Although in the foregoing a scenario with one depth cam and one 2D videocamera has been considered, this is not to be intended as a limitation of the present invention.

In an embodiment of the present invention, one depth cam may be associated with a plurality of 2D videocameras; the operations described above in connection with FIG. 3 are carried out for every point of view, i.e. for every point in which a videocamera is located (and, possibly, for virtual points of view, where there is no videocamera). The matching operations may be performed by taking two or more 2D video frames generated by different 2D videocameras: the parameters q and m are characteristic of the single depth cam used, and thus they are independent from the point of view. One or more points of view may be used for cumulating the cost function used in the matching: the cost function may consider multiple predictions at the same time, obtained from a single depth cam. In such a case, the cost function will try to define the best matching computed on all the predictions (corresponding to different point of views) simultaneously. In a different approach, the cost function may be computed by considering two predictions for the same point of view, from two different depth cams operating at different time intervals, as discussed hereinbelow (the time intervals being close enough to ensure correlation between frames). In this second case the cost function will consider the parameters of two independent depth cams. A mix of these two techniques is also possible.

In alternative embodiments of the present invention, two or more depth cams may be employed. In such cases, the different depth cams should be synchronized, for example by setting respective acquisition and measurement time windows, so as to avoid the mutual interference, or one depth cam at a time may be periodically activated, or (if the particular depth cam model so allows) enabling the emission of IR pulses in respect of one depth cam at a time, keeping activated the measurement sensors.

Assuming to have a common time base, and that different measurement time windows can be independently set for the different depth cams, the solution according to the described embodiment of the present invention is useful for equalizing the depth measures taken by the different depth cams, so that they refer to a common scale. In fact, the depth maps generated by a generic depth cam are referred to grey levels scales that are different from those of the other depth cams. The method of the present invention allows determining the equalization parameters q and m for any depth cam independently from the others.

In a multi-depth cam scenario, with different depth cams active in non-overlapping time windows, the solution according to the present invention can also be exploited for synthesizing the depth maps corresponding to the observation points of the inactive depth cams starting from the depth map generated by the active depth cam. This allows achieving a better fluidity in the acquired video sequence.

Hereinafter, some possible application scenarios of the present invention are presented, being intended that different applications can be envisaged.

Figure 12:
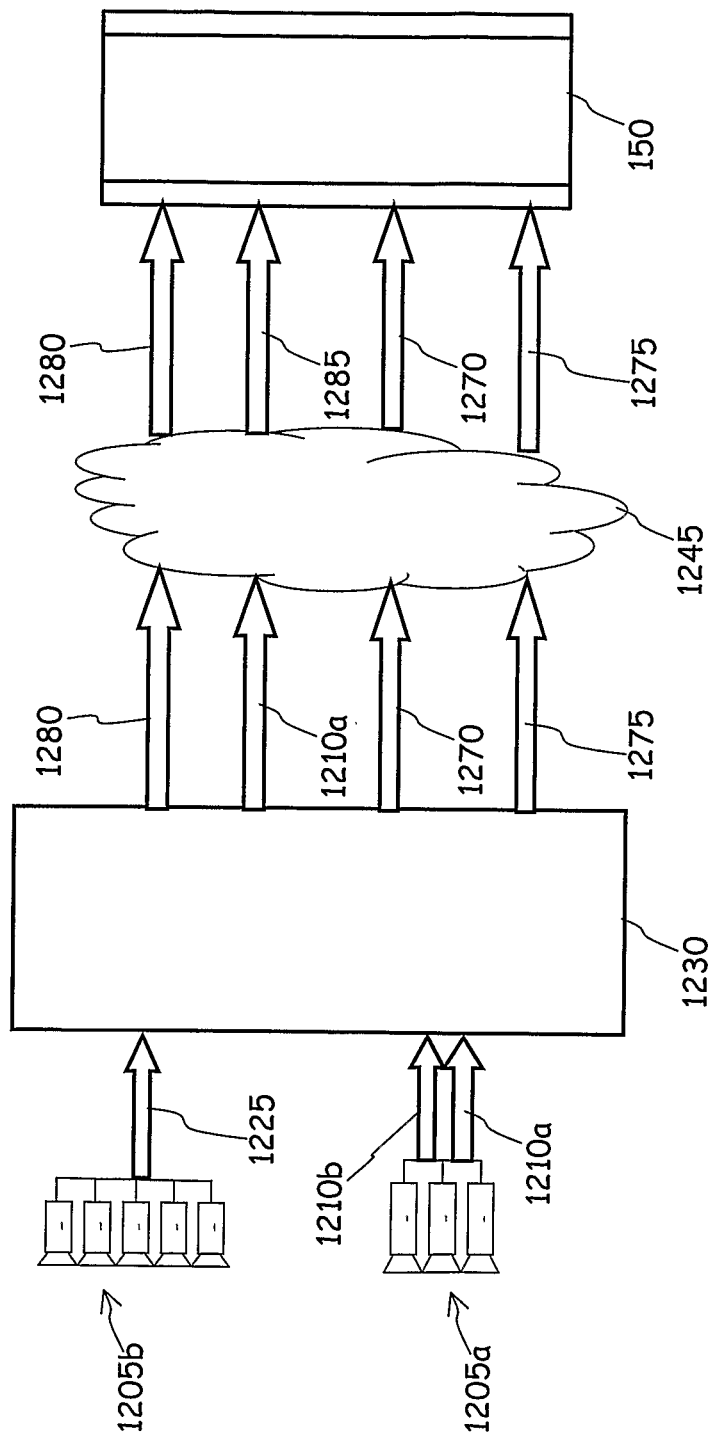
FIGS. 12 and 13 schematically shows possible practical applications of a system according to the present invention.

One possible application is schematically depicted in FIG. 12. In the considered example, it is assumed that a first plurality 1205a of Y depth cams is associated with a second plurality 1205b of X 2D videocameras (the number Y of depth cams being independent from the number X of 2D videocameras). The Y depth cams of the plurality 1205a generate Y sequences 1210a of depth maps and Y 2D video frame sequences 1210a, and the X 2D videocameras of the plurality 1205b generate X 2D video frames sequences 1225. The Y depth maps sequences 1210a, the Y 2D video frame sequences 1210a, and the X 2D video frames sequences 1225 are inputted to an acquisition and processing subsystem 1230 which, implementing the method described in the foregoing, synthetizes X+K new predicted depth frames sequences 1270 and K new predicted 2D video frames sequences 1275 (with K being an integer equal to or greater than 0); the X new predicted depth frames sequences are the depth maps synthesized for the observation points of the X 2D videocameras of the plurality 1205b; the K new predicted depth frames sequences and the K new predicted 2D video frames sequences correspond to virtual observation points (where no videocamera is actually located). The X+K new predicted depth frames sequences 1270 and the K new predicted 2D video frames sequences 1275, together with the X+Y 2D video frames sequences 1280 and the Y depth maps sequences 1210a are then encoded and transmitted over a communication channel 1245, and received and displayed to a user through a 3D display 1250.

Thus, in the application just described, a number of (X+Y+K) 2D frames sequences plus (X+Y+K) depth map frames sequences is transmitted through the communication channel.

Figure 13:
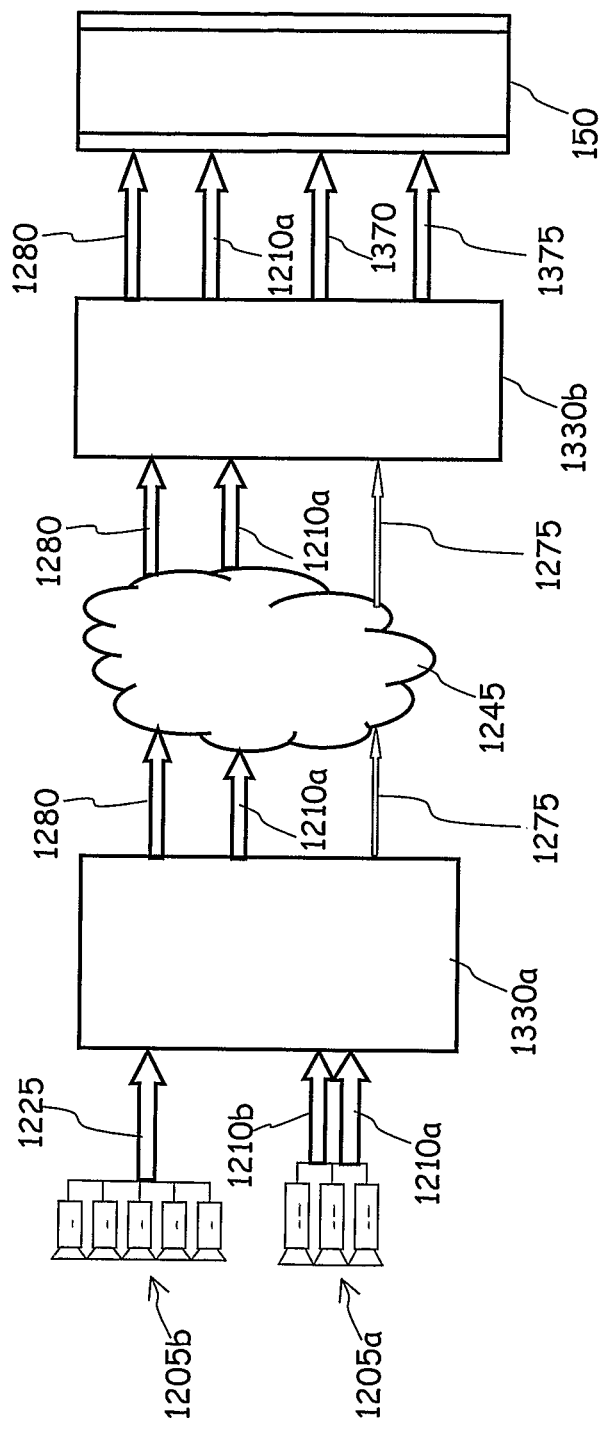

An application adapted to reduce the amount of information to be transmitted through the distribution channel is depicted in FIG. 13.

The Y depth maps sequences 1210a, the Y 2D video frame sequences 1210a, and the X 2D video frames sequences 1225 are inputted to an acquisition and processing subsystem 1330a which, implementing the method described in the foregoing, calculates in real-time the equalization parameters q, m and S for the Y depth cams 1205a and transmits them over the communication channel 1245. The X+Y 2D video frames sequences 1280 and the Y depth maps sequences 1210a are then encoded and transmitted over the communication channel 1245, and received by processing subsystem 1330b, located remotely from the where the scene 105 is recorded, for example at the user's premises; the processing subsystem 1330b, still implementing the method described above, synthesizes the predicted depth maps for the observation points of the 2D videocameras 1205b, and, optionally, 2D video frames sequences and associated depth maps for virtual observation points. In order to perform the prediction, the processing subsystem 1330b also needs geometric parameters describing the acquisition configurations of the camera (e.g. relative distance of the videocameras, their orientation angles, etc.) but these data does not change during acquisition and can be transmitted over the communication channel 1245 immediately after the pre-calibration phase (which is carried out by the processing subsystem 1330a) before the real-time video acquisition. The X+Y 2D video frames sequences 1280 and the Y depth maps sequences 1210a, together with the X+K new predicted depth frames sequences 1370 and the K new predicted 2D video frames sequences 1375 are then fed to the 3D display device 150 of the user, for being visualized.

In this way, the number of video frames sequences to be transmitted through the communication channel is significantly reduced, without essentially any impact on the resulting quality.

In principle, even the real-time calculation of the parameters q, m and S used for the prediction could be accomplished at the end user's premises; however, the apparatuses present where the scene 105 is recorded are less in number and can be more complex and computationally powerful than the end user's devices, thus, it may be preferable to keep all the computationally-intensive part of the method (i.e., the real-time calculation of the depth cams equalization parameters) in the relatively few apparatuses located where the scene 105 is recorded, so that the user devices can be simpler and less expensive.

The method described in the foregoing can be implemented in software, in hardware or partly in software and partly in hardware. The processing of the captured 2D video frames sequences and of the depth maps for obtaining predicted depth maps and predicted 2D video frames sequences can be carried out using a data processing apparatus like a general-purpose computer.

In conclusion, the solution according to the present invention allows generating even a higher number of multi-view 3D video flows with relatively limited computations, and is thus adapted to real-time applications like videocommunications and videoconferencing.

Although in the exemplary embodiments described in the foregoing the use of depth maps generated by depth cams has been considered, this is not a limitation of the proposed solution, which in general can use any form of representation of the distance of different parts of the captured scene, like for example disparity maps, which provide a measure of the relative distance of the pixels viewed from different angles.

An advantage of the proposed solution is that the high costs inherent to the use of arrays of pre-calibrated videocameras and of real-time calibration algorithms can be avoided, because the method of the present invention does not require a high correlation between different videocameras.

The solution according to the present invention allows realizing multi-view 3D systems, and overcomes the problems inherent to the use of multiple depth cams, like the mutual interference in the acquisition phase and the equalization of different depth maps.

The method allows a self-calibration of the equalization parameters used by the depth cams for generating the depth maps.

The treatment of jumps and ghost effects improves the quality of the generated video flows compared to those generated by conventional synthesis of video flows taken from different observation points.

The possibility of generating video flows corresponding to virtual observation points with a limited computational burden increases the flexibility of the solution.

The generation of predicted depth maps and 2D video sequences can be accomplished in the video acquisition phase or at the end user premises.

The present invention has been here described making reference to some possible embodiments thereof, however those skilled in the art will recognize that several changes to the described embodiments can be envisaged, as well as different embodiments, without departing from the protection scope defined in the appended claims.

The invention claimed is:

1. A method for producing 3D multi-view visual contents, comprising:

generating, by at least one first image capturing device, a first bidimensional image of a visual scene and a corresponding first depth map indicative of a distance of different parts of the visual scene from an at least one first point of view;

generating, by at least one second image capturing device different from the at least one first image capturing device and positioned a first distance from the at least one first image capturing device, a second bidimensional image of the visual scene from at least one second point of view;

generating, by a computing device, at least one predicted second bidimensional image based on the first bidimensional image and the first distance between the at least one first image capturing device and the at least one second image capturing device, the at least one predicted second bidimensional image predicting the visual scene captured from the at least one second point of view; and generating, by the computing device, at least one predicted second depth map predictive of a distance of different parts of the visual scene from the at least one second point of view by processing the first depth map, the at least one predicted second bidimensional image and the second bidimensional image.

2. The method of claim 1, wherein said generating the at least one predicted second depth map comprises comparing the at least one predicted second bidimensional image with the at least one second bidimensional image of the scene.

3. The method of claim 2, wherein said generating the first depth map comprises mapping a detected distance of different parts of the scene from the first point of view onto a scale of values, and wherein said generating the at least one predicted second depth map comprises varying mapping parameters (q, m) used for said mapping until detecting a match between said predicted second bidimensional image and the second bidimensional image of the scene.

4. The method of claim 3, wherein said mapping includes performing a transformation of a detected distance of a point of the captured scene into a luminance value of the corresponding pixel, and said varying mapping parameters includes changing parameters for said transformation.

5. The method of claim 2, wherein said comparing comprises calculating differences between values of pixels of at least one area within said predicted second bidimensional image and said second bidimensional image.

6. The method of claim 5, wherein said comparing comprises calculating a cumulated value of said calculated differences between the values of the pixels of said at least one area, and determining whether a match exists between said predicted second bidimensional image and the second bidimensional image of the scene based on the calculated cumulated value.

7. The method of claim 6, wherein said calculating a cumulated value comprises exploiting information provided by the first depth map to differently weight the values of different pixels of said at least one area.

8. The method of claim 1, comprising performing an initial calibration for determining geometrical parameters defining a geometry under which the scene is respectively seen from the first and second points of view.

9. The method of claim 1, further comprising correcting jumps and ghost effects in the at least one predicted second bidimensional image.

10. A system for producing 3D multi-view visual contents, comprising:

at least one first image capturing device arranged for capturing a visual scene from at least one first point of view and configured to generate a first bidimensional image of the visual scene and a corresponding first depth map indicative of a distance of different parts of the visual scene from the first point of view;

at least one second image capturing device arranged for capturing the visual scene from at least one second point of view and configured to generate a second bidimensional image of the scene, wherein the at least one second image capturing device is different from the at least one first image capturing device and positioned a first distance from the at least one first image capturing device;

a computer having a computer program stored thereon, which when executed, causes the computer to:
acquire the first bidimensional image, the first depth map and the second bidimensional image;
generate at least one predicted second bidimensional image based on the first bidimensional image and the first distance between the at least one first image capturing device and the at least one second image capturing device, the at least one predicted second bidimensional image predicting the visual scene captured from the at least one second point of view; and
generate at least one predicted second depth map predictive of a distance of different parts of the visual scene from the at least one second point of view by processing the first depth map, the at least one predicted second bidimensional image and the second bidimensional image.

11. The system of claim 10, wherein the computer program, when executed, further causes the computer to distribute the 3D multi-view visual contents over a communication channel.

12. The system of claim 11, wherein the computer program, when executed, further causes the computer to distribute over said communication channel the first bidimensional image, the first depth map, the second bidimensional image and the at least one predicted second depth map.

13. The system of claim 11, wherein the computer program comprises:

a first subsystem module operable to
acquire the first bidimensional image, the first depth map and the second bidimensional image;
process the first bidimensional image to calculate prediction parameters (q,m) useful to derive at least one predicted second bidimensional image predicting the visual scene captured from the at least one second point of view; and
distribute over the communication channel the first bidimensional image, the first depth map, the second bidimensional image and the calculated prediction parameters; and a second subsystem module operable to
receive over said communication channel, the first bidimensional image, the first depth map, the second bidimensional image and the calculated prediction parameters, and
derive at least one predicted second depth map predictive of a distance of different parts of the scene from the at least one second point of view by processing the first depth map, the at least one predicted second bidimensional image and the second bidimensional image based on the prediction parameters.

14. The system of claim 10, wherein said first depth map comprises a mapping of a detected distance of different parts of the scene from the first point of view onto a scale of values, and wherein said at least one predicted second depth map is derived by varying mapping parameters (q, m) used for said mapping until a match between said predicted second bidimensional image and the second bidimensional image of the scene is detected.

15. A non-transitory computer readable medium having stored thereon a computer program including computer program code modules adapted to perform, when the computer program is executed by a data processor, a method comprising:

generating, by at least one first image capturing device, a first bidimensional image of a visual scene and a corresponding first depth map indicative of a distance of different parts of the visual scene from at least one first point of view;

generating, by at least one second image capturing device different from the at least one first image capturing device and positioned a first distance from the at least one first image capturing device, a second bidimensional image of the visual scene from at least one second point of view;

generating at least one predicted second bidimensional image based on the first bidimensional image and the first distance between the at least one first image capturing device and the at least one second image capturing device, the at least one predicted second bidimensional image predicting the visual scene captured from the at least one second point of view; and generating at least one predicted second depth map predictive of a distance of different parts of the visual scene from the at least one second point of view by processing the first depth map, the at least one predicted second bidimensional image and the second bidimensional image.

16. The non-transitory computer readable medium of claim 15, wherein said generating the at least one predicted second depth map comprises comparing the at least one predicted second bidimensional image with the at least one second bidimensional image of the scene.

17. The non-transitory computer readable medium of claim 16, wherein said generating the first depth map comprises mapping a detected distance of different parts of the scene from the first point of view onto a scale of values, and wherein said generating the at least one predicted second depth map comprises varying mapping parameters (q, m) used for said mapping until detecting a match between said predicted second bidimensional image and the second bidimensional image of the scene.

18. The method of claim 1, wherein the at least one second image capturing device has a first angle with respect to a direction orthogonal to a plane of the at least one first image capturing device and the at least one second image capturing device, and wherein generating the at least one predicted second bidimensional image comprises: generating the at least one predicted second bidimensional image based on the first bidimensional image, the first distance, and the first angle.

* * * * *